(12) United States Patent  (10) Patent No.: US 7,546,598 B2
Blumenthal et al. (45) Date of Patent: Jun. 9, 2009

(54) MEASURING SOFTWARE SYSTEM PERFORMANCE USING BENCHMARKS

(75) Inventors: Andreas Blumenthal, Heidelberg (DE); Mirko Luedde, Hildesheim (DE); Thomas Manzke, Bensheim (DE); Bjoern Mielenhausen, Sandhausen (DE); Christiaan E. Swanepoel, Heidelberg (DE)

(73) Assignee: Sap Aktiengesellschaft, Walldorf (DE)

( * ) Notice: Subject to any disclaimer, the term of this patent is extended or adjusted under 35 U.S.C. 154(b) by 916 days.

(21) Appl. No.: 10/934,940

(22) Filed: Sep. 3, 2004

(65) Prior Publication Data

US 2005/0120341 A1    Jun. 2, 2005

Related U.S. Application Data

(60) Provisional application No. 60/500,282, filed on Sep. 3, 2003.

(51) Int. Cl.
*G06F 9/455* (2006.01)
*G06F 9/46* (2006.01)
*G06F 9/44* (2006.01)
*G06F 9/45* (2006.01)
*G06F 11/00* (2006.01)

(52) U.S. Cl. .................... 718/1; 718/100; 718/106; 717/127; 717/131; 717/148; 717/154; 717/158; 714/47; 714/38

(58) Field of Classification Search ............ 718/1, 718/100, 102, 103, 106, 107, 108; 717/127, 717/131, 154, 135, 148, 149, 159, 158; 714/47, 714/38
See application file for complete search history.

(56) References Cited

U.S. PATENT DOCUMENTS

| 5,367,687 | A  | * | 11/1994 | Tarsy et al. ................ 717/149 |
| 5,960,198 | A  | * |  9/1999 | Roediger et al. ............ 717/130 |
| 6,118,940 | A  | * |  9/2000 | Alexander et al. .......... 717/127 |
| 6,256,775 | B1 | * |  7/2001 | Flynn ........................ 717/127 |
| 6,594,824 | B1 | * |  7/2003 | Volkonsky et al. .......... 717/159 |
| 6,850,920 | B2 | * |  2/2005 | Vetter ......................... 706/11 |

(Continued)

OTHER PUBLICATIONS

Xiaolan Zhang, Margo Seltzer; HBench:Java: An Application-Specific Benchmarking Framework for Java Virtual Machines; Proceedings of the ACM 2000 conference on Java Grande; pp. 62-70; Year of Publication: 2000.*

(Continued)

*Primary Examiner*—Meng-Ai An
*Assistant Examiner*—Abdullah Al Kawsar
(74) *Attorney, Agent, or Firm*—Fish & Richardson P.C.

(57) ABSTRACT

Methods and apparatus, including computer program products, for measuring the performance of aspects of a complex data processing system. In one aspect, a method uses a dynamic synthetic benchmark to provide performance information for a program application running on a virtual machine. The benchmark in one implementation uses a load profile that includes information about instructions that make up the application, their call frequencies, and their workloads. Microbenchmarks of individual virtual machine instructions provide performance information about the virtual machine that is used with the load profile to synthesize a performance benchmark for the application.

20 Claims, 3 Drawing Sheets

U.S. PATENT DOCUMENTS

| | | | |
|---|---|---|---|
| 6,859,784 B1* | 2/2005 | van Duyne et al. | 705/10 |
| 6,882,968 B1* | 4/2005 | Linden | 703/26 |
| 7,007,270 B2* | 2/2006 | Martin et al. | 717/131 |
| 2003/0051234 A1* | 3/2003 | Schmidt | 717/158 |
| 2003/0110421 A1* | 6/2003 | Kurinami et al. | 714/47 |
| 2004/0010785 A1* | 1/2004 | Chauvel et al. | 717/158 |
| 2004/0073899 A1* | 4/2004 | Luk et al. | 717/158 |
| 2005/0131865 A1* | 6/2005 | Jones et al. | 707/2 |

OTHER PUBLICATIONS

Margo Seltzer, David Krinsky, Keith Smith, Xiaolan Zhang; The case for application-specific benchmarking;IEEE; Publication Date: 1999; pp. 1-6.*

Curnow, H.J. and Wichmann, B.A., "A synthetic benchmark", *Computer Journal*, vol. 19, No. 1 (1976), pp. 43-49.

Kemper, A. et al., "Performance Tuning for SAP R/3", *Bulletin of the IEEE Computer Society Technical Committee on Data Engineering*, (Jun. 1993), 12 pages.

Lilja, David J., *Measuring computer performance — A practitioner's guide*, Cambridge University Press, Cambridge, United Kingdom, (2000), pp. 112-114.

Weicker, R.P., "Dhrystone: A Synthetic Systems Programming Benchmark", *Communications of the ACM*, vol. 27, No. 10 (Oct. 1984), pp. 1013-1030.

* cited by examiner

MEASURING SOFTWARE SYSTEM PERFORMANCE USING BENCHMARKS

CROSS-REFERENCE TO RELATED APPLICATIONS

This application claims priority from U.S. Patent Application No. 60/500,282 for "Measuring Application Performance," filed Sep. 3, 2003.

BACKGROUND

The present invention relates to digital data processing, and more particularly to measuring performance aspects of complex data processing systems.

A number of techniques exist for analyzing the performance of software systems. Generally, the performance of different software and hardware systems can be compared using benchmarks. A benchmark, in the context of computer systems, typically includes a performance metric for determining a value that quantifies the performance of a specific aspect of the computer system and a specified set of system conditions that need to be maintained to ensure fair performance comparisons.

One of the first measures of system performance was the time required to perform a single processor instruction such as add or subtract. Because almost all of the instructions of early computers required the same amount of time to execute, the instruction execution time was sufficient to completely characterize the performance of the system.

As instruction sets became more diverse and complicated, instruction-execution profiles were developed, e.g., the Gibson instruction mix (see below). Instruction profiles are lists of the relative frequencies of processor instructions obtained when executing a number of real-world applications. The processor instructions are arranged into classes depending on the number of processor cycles required to execute the instructions. The average instruction time $T_{avg}$ is then calculated as:

$$T_{avg} = \sum_{i=1}^{n} CPI_i \cdot p_i \cdot T_{clock},$$

where n is the total number of classes, $CPI_i$ is the number of clock cycles required to execute an instruction of class i, $p_i$ is the relative frequency of the instruction class, and $T_{clock}$ is the period of one processor clock cycle. Simplified, the average instruction time for the Gibson instruction mix is:

$$T_{avg} = \sum_{i=1}^{n} p_i \cdot t_i, \quad \text{(Eq. 1)}$$

where $t_i$ is the time required to execute an instruction of class i. A lower value of $T_{avg}$ indicates a better overall performance.

Another approach to analyzing performance is the use of synthetic benchmark programs, such as the Dhrystone and Whetstone benchmarks, which are artificial programs that do no real, useful work. Instead, they are modeled in such a way that their instruction mixes represent the relative mix of instructions observed in real-world applications. The execution time of a synthetic benchmark program is thus representative of the runtime of a real application.

A microbenchmark is a program that has been designed to test only some particular portion of a system. It is not intended to be representative of the whole system and therefore it does not fulfill all the characteristics of a good benchmark.

Finally, application benchmark programs (or application benchmarks) represent sets of standardized real application programs that can be used to analyze system performance for a particular class of applications.

Current software systems can be very complex—they are typically composed of a very large number of interacting agents, and they undergo continuous, highly parallelized improvement and development. As a result, it is often difficult to anticipate the performance effects (be they positive or negative) of even well delimited changes to the software systems, or to detect the causes of creeping performance deterioration. The situation may become more aggravated when different software layers are being developed in different systems (and only deployed into a joint system at a late stage of development). In addition, the situation is worsened when there is a massive granularity mismatch between applications (the performance of which is the important measure in the end) and the underlying elementary software building blocks like the instructions of a virtual machine, and when both the applications and the building blocks experience changes in parallel.

SUMMARY OF THE INVENTION

The present invention provides methods and apparatus, including computer program products, for modeling and analyzing the performance of applications running on an abstract machine for which an interpreter exists (e.g., a virtual machine). A "dynamic synthetic benchmark" incorporates the use of an instruction profile together with a set of microbenchmarks to estimate an application's execution time at different stages of development. The instruction profiles are based on classes of virtual machine (VM-) instructions that take into consideration special characteristics of each VM-instruction and its runtime behavior, in particular, the code paths executed for the instruction and the data on which the instruction operates (its workload). Application performance is calculated as the sum of the weighted "average" execution times of instruction classes (see Eq. 1) obtained using one or several microbenchmarks.

In general, in one aspect, the invention features systems and techniques for measuring the performance of an application using a dynamic synthetic benchmark. An instruction profile of an application is obtained, a set of microbenchmarks is designed, and the instruction profile is mapped to the set of microbenchmarks. The instruction profile includes information about instructions comprising the application and call frequencies of the instructions. The set of microbenchmarks is for measuring runtimes of statements having instructions that match instructions identified in the instruction profile.

The invention can be implemented to include one or more of the following advantageous features. Designing the set of microbenchmarks includes implementing one or more microbenchmarks to measure the runtime of each virtual machine instruction in the instruction set of the virtual machine. Implementing one or more microbenchmarks to measure the runtime of each virtual machine instruction can include, for each virtual instruction, implementing a plurality of statement tests with each statement test using different operative data, measuring a runtime for each statement test in the plurality of statement tests, and calculating an average of the measured runtimes.

Mapping the instruction profile to the set of microbenchmarks can include mapping each of the instructions in the application to a corresponding microbenchmark. A weighted total execution time of the microbenchmarks is calculated such that the microbenchmarks are weighted according to the call frequency of the instruction corresponding to each microbenchmark. After changes are made to the virtual machine, new runtimes of statements affected by the changes to the virtual machine are measured, and a new weighted total execution time of the microbenchmarks is calculated using the new runtimes. After changes are made to the application, a new instruction profile of the changed application can be obtained, and a new weighted total execution time of the microbenchmarks is calculated by adjusting the weights of the microbenchmarks according to the new instruction profile.

It is advantageous for the instruction profile of the application to be a load profile. A load profile is a refinement of the instruction profile on the basis of the characteristics associated with each virtual machine instruction, the code path executed for each instruction, and the workloads experienced by the instructions in end-user applications.

Designing a set of microbenchmarks can include refining an existing set of microbenchmarks based on the instruction profile to obtain a set of microbenchmarks that more accurately represents the instructions comprising the application.

In another general aspect, a profile of programming language virtual machine instructions in an application is obtained, and a performance of the application running on a server is predicted using the profile.

The invention can be implemented to include one or more of the following advantageous features. Predicting a performance of the application includes measuring runtimes of statements that represent individual programming language virtual machine instructions, and calculating a performance metric based on the profile and the statement runtimes. Calculating a performance metric includes calculating a weighted total execution time of the runtimes based on the profile. The profile identifies the programming language virtual machine instructions in the application and a call or execution frequency of the programming language virtual machine instructions in the application. Measuring runtimes of statements that represent individual programming language virtual machine instructions includes measuring runtimes of the statements using a plurality of workloads, and each of the plurality of workloads are defined by a parameter type, a number of parameters, a size of parameters, and/or a value of parameters on which the statements operate.

In another general aspect, runtimes of individual programming language statements are measured, and a weighted average of the programming language statement runtimes and call frequencies of the programming language statements are used to estimate effects of programming language components on server performance.

The invention can be implemented to include one or more of the following advantageous features. The programming language components include a kernel for the programming language, and changes can be made in the kernel. New runtimes of individual programming language statements are measured using the changed kernel, and a new weighted average of the new programming language statement runtimes and call frequencies of the programming language statements are calculated to estimate effects of the changes in the kernel.

Each of the above aspects and features of the invention can be implemented as a method, in a system or apparatus, or as a computer program product, tangibly embodied in an information carrier, for measuring the performance of an application by causing a data processing apparatus to execute instructions for carrying out the techniques of the invention.

The invention can be implemented to realize one or more of the following advantages. Dynamic synthetic benchmarks can be used to identify creeping performance deterioration efficiently and to debug performance. Dynamic synthetic benchmarks can be used to model real-world applications accurately by taking into account the workloads of individual instructions. Developers can immediately investigate the effects of minor changes to the kernel on the performance of complex software systems. The performance of real-world applications and comparisons between different releases or versions of a particular application can also be investigated. The consistency of other existing benchmarks between measurements, such as application benchmark programs, can also be conveniently verified. It is further possible to verify if these benchmarks are representative of real-world applications by investigating their workloads. The invention only relies on instrumentation in the virtual machine to obtain instruction profiles. Time measurements require no instrumentation and can be performed independently using a "clean" virtual machine, with minimal perturbation. New dynamic synthetic benchmarks can be created quickly and easily to measure the performance of new system features. The invention reduces the costs of developing expensive and complex benchmarks. In addition, quality assurance can begin earlier and the overall development process can be optimized. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Performance measurements can be used to analyze performance aspects of complex software systems. One familiar architecture for complex software systems includes a kernel that provides a runtime environment in which application programs are executed. A kernel typically implements a number of functions; for purposes of the present specification, we specify only that a virtual machine on which application programs run be considered part of the kernel. In addition to a virtual machine, a kernel might also provide user and process administration, database access, inter-system communication, and platform independence.

In the context of such an architecture, performance measurements can be used to determine the impact kernel changes can have on applications near the time of development, to debug performance problems, to identify creeping performance deterioration, to predict the performance of a real-world application, to compare the performance between different releases of an application, and to verify the consistency of other existing benchmarks, such as application benchmarks. These measurements can be advantageously obtained using dynamic synthetic benchmarks. Dynamic synthetic benchmarks support an analysis of small components, which are useful for performance debugging and identifying creeping performance deterioration, while still obtaining performance measurements representative of end-user applications.

Figure 1:
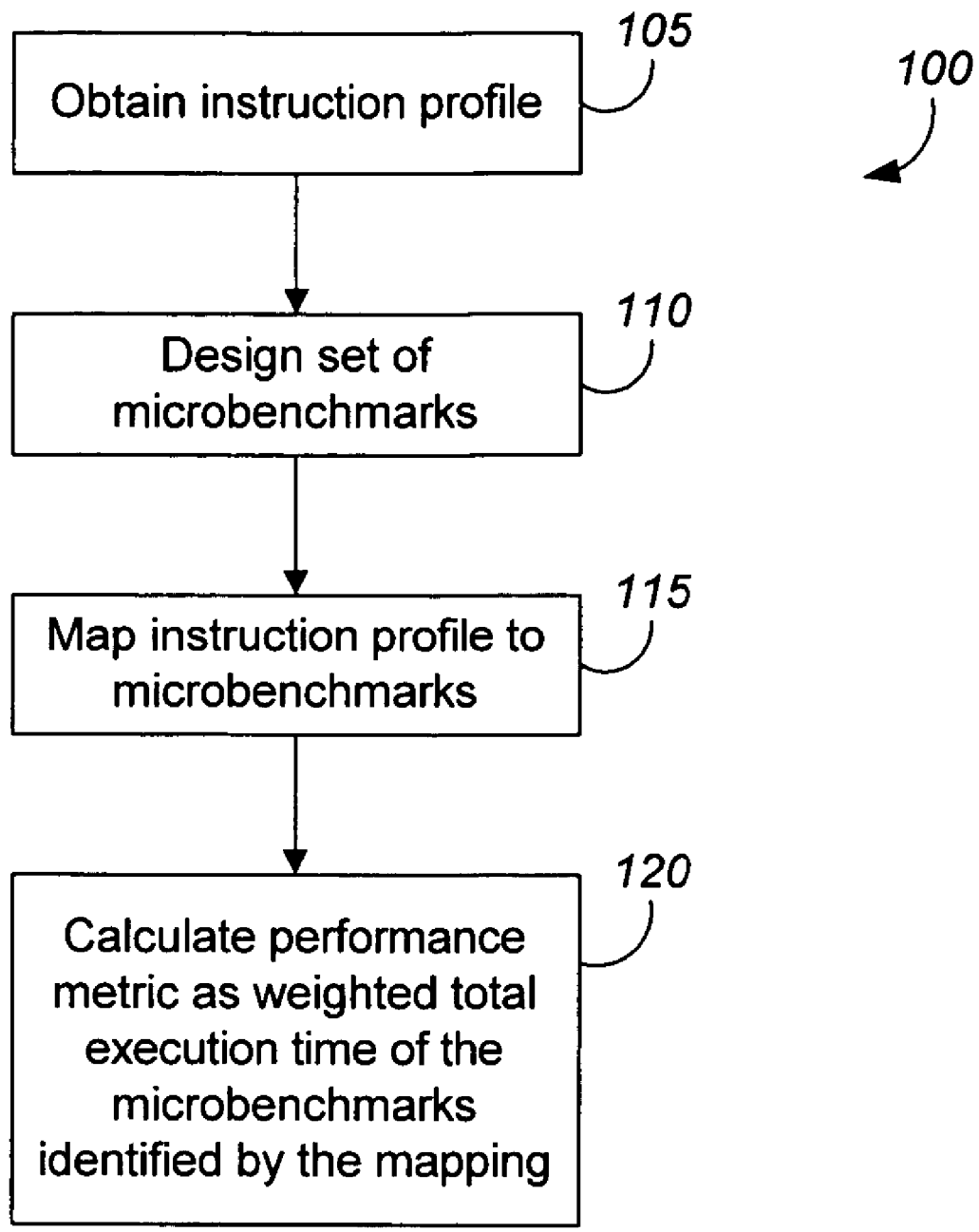
FIG. 1 is a flow diagram of a process for implementing a dynamic synthetic benchmark to analyze performance of an application.

FIG. 1 is a flow diagram of a process 100 for implementing a dynamic synthetic benchmark to analyze performance of an application. An instruction profile of an application is obtained (step 105). The instruction profile includes information identifying instructions included in the application and information about call or execution frequencies of those instructions. The instruction profile is determined for virtual machine instructions, as opposed to CPU instructions, and can be obtained using a profiling (instruction trace) tool suitable for the environment, as will be described in more detail later in this specification.

A set of microbenchmarks is also designed (step 110). The microbenchmarks are for measuring runtimes of statements of the high level language having instructions that match the instructions identified in the instruction profile. The extendable set of microbenchmarks can first be designed on the basis of the instruction set of the virtual machine on which the application can be executed. All virtual machines have a finite set of basic/elementary instructions, such as MOVE, ADD, WRITE, etc. (i.e., virtual machine instructions). A microbenchmark can be a single statement test or a multiple statement test and can, for example, use ABAP statements, Java statements, or other language statements.

For purposes of the following description, the term "virtual machine instruction" means any type of virtual machine instruction. A profile obtained on the basis of virtual machine instructions will contain the relative frequencies of virtual machine instructions in some sample of applications.

Virtual machine instructions can be refined on the basis of one or several secondary characteristics to obtain "sub-instructions." Extra information available for each virtual machine instruction can be used to identify different variations of the virtual machine instruction. These sub-instructions will be referred to as "micro-instructions." For example, for a virtual machine instruction that is generated for calls to the operating system (i.e., system calls), there typically are many different types of calls that can be made. All of these different types of calls are executed using the same virtual machine instruction. Information about the type of call is stored for the virtual machine instruction. In the case of ABAP, for example, the information about the type of call is stored in a predefined byte, called the "flagbyte." Information about the type of call can be used to refine the virtual machine instruction. In some cases, a virtual machine instruction has only one variation (e.g., only one possible flagbyte value), in which case the terms "virtual machine instruction" and "micro-instruction" are synonymous.

Another refinement can be made on the basis of the runtime behavior of the individual micro-instructions. The runtime behavior is typically affected: a) by the specific code path executed for the instruction; and b) by the data on which the instructions operate (i.e., the workload for the instructions). With respect to the runtime behavior being affected by the specific code path executed for the instruction, in the case of complex micro-instructions, it is not uncommon that different coding is executed for one and the same micro-instruction, depending on the context in which the instruction is executed. For example, a particular micro instruction can concatenate two strings. In one possible situation, if there is enough space in the first string (e.g., the first string is stored in a memory location that includes a sufficient number of unused bytes), the second string might simply be appended to the first. In an alternative situation, if there is not enough space in the first string, the first string is resized (e.g., a larger amount of memory is allocated and the first string is copied into the new memory block) before the second string is appended. In these two alternatives, the micro-instruction has two distinctly different execution times, depending on whether memory is allocated or not. In such cases, the micro-instruction can be further refined on the basis of the code path executed. Complex micro-instructions might also contain iterations in which code fragments are executed a varying number of times. The data on which the instructions operate can also affect the runtime behavior. For example, where integers and floating point numbers are of different sizes in memory, the instruction "MOVE" will have different execution times depending on whether the instruction is executed with integers or with floating point numbers.

The term "virtual instruction" means a micro-instruction that is further refined to take into consideration the runtime behavior of the individual micro-instructions. A profile obtained on the basis of a virtual instruction is called a "load profile".

In the above example, "with integers/with floating point numbers" is a dimension by which the instructions are refined. Instructions can be refined using any number of dimensions (e.g., with the dimensions "parameter type" and "parameter size"). For example, <MOVE, "characters", "10 bytes"> and <MOVE, "character string", "25 bytes"> define the same instruction with different parameter types and different parameter sizes. As further discussed below, the use of virtual instructions/load profiles allows for more relevant and reliable performance measurements. For both virtual machine instructions/instruction profiles and virtual instructions/load profiles, a set of microbenchmarks is mapped according to their corresponding virtual machine, micro- or virtual instructions, respectively. The set of microbenchmarks mapped to virtual machine instructions can generally be considered to be a subset of the set of microbenchmarks mapped to virtual instructions.

After a set of microbenchmarks is designed, microbenchmarks are performed to measure the runtime of individual virtual machine instructions, micro-instructions, and/or virtual instructions. Microbenchmarks may also be performed to measure the runtime of blocks of statements. In an SAP R/3 environment, the measurement of the runtime of microbenchmarks can be performed, using SSQJ, which is a generic measurement tool that can be used to determine the runtime of individual ABAP statements or blocks of statements. As such it can be considered to be a framework in which microbenchmarks are executed for investigating the performance of individual statements.

There is a strong correlation between virtual machine instructions/virtual instructions and the high level language (e.g., ABAP, Java, etc.) in which an application is written. It is therefore possible to write a statement in the high level language, where the statement includes the virtual machine instruction/virtual instruction to be measured. Preferably, for accurate and reliable measurements, the statement includes only the instruction to be measured. Because an end-user application is compiled into virtual machine instructions, if the virtual machine instructions are traced, it is possible to draw conclusions about the statements comprising the applications (including their workload). This allows a "reconstruction" or modeling of the application and allows measurement of the application's performance by measuring the performance of the individual statements (instructions) using Eq. 1. These statements (and thus the instructions) are measured using microbenchmarks (e.g., single statement tests).

The instruction profile is mapped to the set of microbenchmarks using some mapping function (step 115). For example, the instruction profile may be mapped to the set of microbenchmarks using a function:

$$\phi: i_1, \ldots, i_n \mapsto b_1, \ldots, b_n,$$

where $i_1, \ldots, i_n$ represent the instructions in the application and $b_1, \ldots, b_n$ represent the set of microbenchmarks. Each instruction i in the instruction profile is mapped to a microbenchmark b that measures the runtime of a statement s. The statement s includes an instruction that matches the instruction i. The statement can include an instruction i' such that i=i' or the instruction i' can be representative of, although not identical to, the instruction i.

A performance metric for the dynamic synthetic benchmark is calculated as the weighted total execution time of the microbenchmarks identified by the mapping of the instruction profile to the set of microbenchmarks (step 120). The weighted total execution time is calculated according to the following variation of Eq. 1:

$$T_w = \sum_{i=1}^{n} f_i \cdot t_i,$$

where the performance metric $T_w$ is the weighted total execution time, n is the total number of instructions in the instruction profile, $f_i$ is the call frequency of virtual instruction i, and $t_i$ is the estimated runtime of the virtual instruction i, which is derived from the microbenchmark for i. Thus, the performance of the dynamic synthetic benchmark is quantified using the various independently measured microbenchmarks.

As a result, performance measurements can be representative of end-user applications and can be used to predict the performance of a complex software system with respect to the end-user or real-world application. Causes of performance deterioration relating to the virtual machine instructions can be determined quickly and effectively by investigating the independently measured statement runtimes, rather than the overall execution time of a synthetic benchmark. Similarly, creeping performance deterioration can be monitored by regularly investigating the performance of the individual statements that are included in the dynamic synthetic benchmark. Any number of new dynamic synthetic benchmarks can be defined by profiling additional end-user applications and storing the profiles together with the mapping information in a database, file or other data repository.

The end-user applications can include standard application benchmark programs. For purposes of quantifying the performance of a virtual machine during a process of designing or modifying the virtual machine, the application that is selected for the dynamic synthetic benchmark can be representative of a large number of applications that are expected to be executed on the virtual machine.

The instruction profile that is obtained from an application at step 105 is advantageously a load profile, which further provides information about the runtime behavior of the application statements, e.g., about the parameters passed to the application statements. A load profile is a refinement of the instruction profile on the basis of the characteristics associated with each virtual machine instruction, the code path executed for each instruction and the instructions' workloads.

By identifying the workloads of instructions in end-user applications, the microbenchmarks can be used to measure statements having instructions that better represent the instructions in the end-user applications. The load profile can then be used by the mapping function to provide a more accurate dynamic synthetic benchmark. Each instruction or statement can operate on one or more different categories (or dimensions) of data. For example, each virtual machine instruction can be refined by one or more dimensions, where a dimension is a criterion by which an instruction is refined. Each dimension can have one or more values that potentially affect a workload for the instruction. A virtual instruction is then defined by a combination of one value in each dimension. The categories can include quantitative dimensions that refine the instructions based on numerical properties, such as "parameter size" and "number of parameters," and qualitative dimensions that refine the instructions based on non-numerical properties, such as "parameter type" and "table type." By accounting for different workloads for instructions and/or other variables that affect the runtime behavior of the instructions, the dynamic synthetic benchmark can provide a more accurate estimation of performance.

A particular instruction or statement can have different microbenchmarks for each possible virtual instruction. In other words, each unique combination of dimension values for a virtual machine instruction can have its own microbenchmark. For example, if an instruction has two different values for the dimension "parameter type" (e.g., integer and floating point) and two different values for the dimension "number of parameters" (e.g., 8 and 3), four different virtual instructions can be defined (i.e., according to a Cartesian product of the values). Furthermore, a qualitative dimension "Memory allocated?" relating to the code path executed for the instructions might have two values "YES" and "NO," in which case eight different virtual instructions can be defined.

In some cases, the number of potential microbenchmarks required to measure the virtual instructions can be very large. To limit the number of microbenchmarks or to limit the mapping complexity, the dimension values can be grouped into classes of similar values. Each class can then be treated as a single value.

Quantitative values can be grouped together to form intervals, and qualitative values can be categorized by type. For example, if a particular instruction is refined using a quantitative dimension "parameter size" that can have a value between 0 and 100 bytes, a separate class may be defined for each interval of 10 bytes (e.g., 0-9, 10-19, 20-29, etc.). The size of each class and/or the number of classes can be selected according to the frequency that a particular workload typically occurs and/or the amount of variation in runtime measurements between different values. Thus, one value or class from each dimension used for refining the virtual machine or micro-instruction defines one virtual instruction.

During mapping of instructions, each virtual instruction is mapped to at least one microbenchmark (at step 115).

When multiple dimension values are included in a single class, the execution time for each microbenchmark is generally not entirely accurate. The amount of error introduced can be reduced if the class is composed of dimension values that result in similar execution times (i.e., execution times that fall within a relatively narrow range).

The execution time obtained from each microbenchmark can be an execution time associated with a median dimension value. The microbenchmark measures an execution time, which is taken to be representative of all dimension values within a class. The quality of the estimation depends on how close the measured time lies to the execution times of the other values in the class. To obtain more accurate performance measurements, it is possible to narrow the class width or to design more than one microbenchmark for the class. Narrowing the class width results in more classes within the dimension and more virtual instructions. For example, instead of defining two classes with values from 0-15 and 16-30, it is possible to define three classes with values from 0-10, 11-20, and 21-30. If an instruction is refined using several dimensions, the refinement results in many more virtual instructions (i.e., obtained as a result of a Cartesian product), each of which is assigned its own microbenchmark.

To design more than one microbenchmark for a class, multiple measurements can be made for a single virtual instruction. For example, for a virtual instruction which is defined by a class with values in the range of 0-30, a microbenchmark can be defined with the value 10, another with the value 20, and a third with the value 29. The number of virtual instructions, however, remains the same. More accurate performance measurements are achieved by estimating a single execution time for all values in the class as the "average" execution time of the three microbenchmarks. The "average" execution time can be calculated using any type of statistical calculation (e.g., simple average, median, weighted average, and the like)

In some implementations, the average runtime can be a weighted average. For example, to provide a more accurate performance metric, the runtimes associated with individual dimension values within the class defining the virtual instruction (i.e., the runtimes of the microbenchmarks) can be weighted according to the relevance of each individual value for the profiled application (e.g., how often does each individual dimension value occur relative to other dimension values in the same class). Assume, for simplicity, that each VM-instruction or micro-instruction is refined using a single dimension with several classes. For each of the resulting virtual instructions (representing one of the classes within the dimension) multiple microbenchmarks are implemented. Using a weighted average of the microbenchmark runtimes (each microbenchmark has a different dimension value within the represented class), the weighted total execution time performance metric is given by:

$$T_w = \sum_{i=1}^{n} f_i \cdot \sum_{j=1}^{m_i} \alpha_{i,j} \cdot t_{i,j}, \quad \text{(Eq. 2)}$$

where n is the total number of profiled instructions, $f_i$ is the call frequency of the i-th instruction, $m_i$ is the number of microbenchmarks implemented for the virtual instruction i, $t_{ij}$ is the mean runtime of the j-th microbenchmark implemented for the virtual instruction i, and $\alpha_{ij}$ is the non-negative weight (dependent on the relevance of the dimension value for the virtual instruction) assigned to the mean. statement runtime of the j-th microbenchmark implemented for the virtual instruction i, such that:

$$\alpha_{i,1} + \alpha_{i,2} + \ldots + \alpha_{i,m_i} = 1.$$

To measure virtual instruction runtimes, each statement representing the instruction can be repeatedly executed a specified number of times and then divided by the specified number. This repetition allows obtaining accurate time measurements when the execution time of the virtual instruction is small compared to the clock resolution.

In some implementations, statements require initializations before they can be executed. In such a case, the initializations can also be performed the specified number of times, without executing the statement, to obtain an estimation of the initialization time, which can be subtracted from the statement runtime measurements to obtain a more accurate statement runtime. For example, the statement runtime $T_{stat}$ can be determined by:

$$T_{stat} = \frac{T_{csup} - T_{cinit}}{n_i},$$

where $T_{csup}$ is the cumulative superficial runtime as measured by executing the statement, including the initialization, $n_i$ times and $T_{cinit}$ is the cumulative initialization runtime as measured by executing the initialization alone $n_i$ times. To achieve accurate time measurements, the number $n_i$ should be large enough that the $T_{csup}$ is significantly larger than the clock resolution and that $T_{stat}$ is at least reasonably larger than the standard error or random variability of $T_{stat}$.

Figure 2:
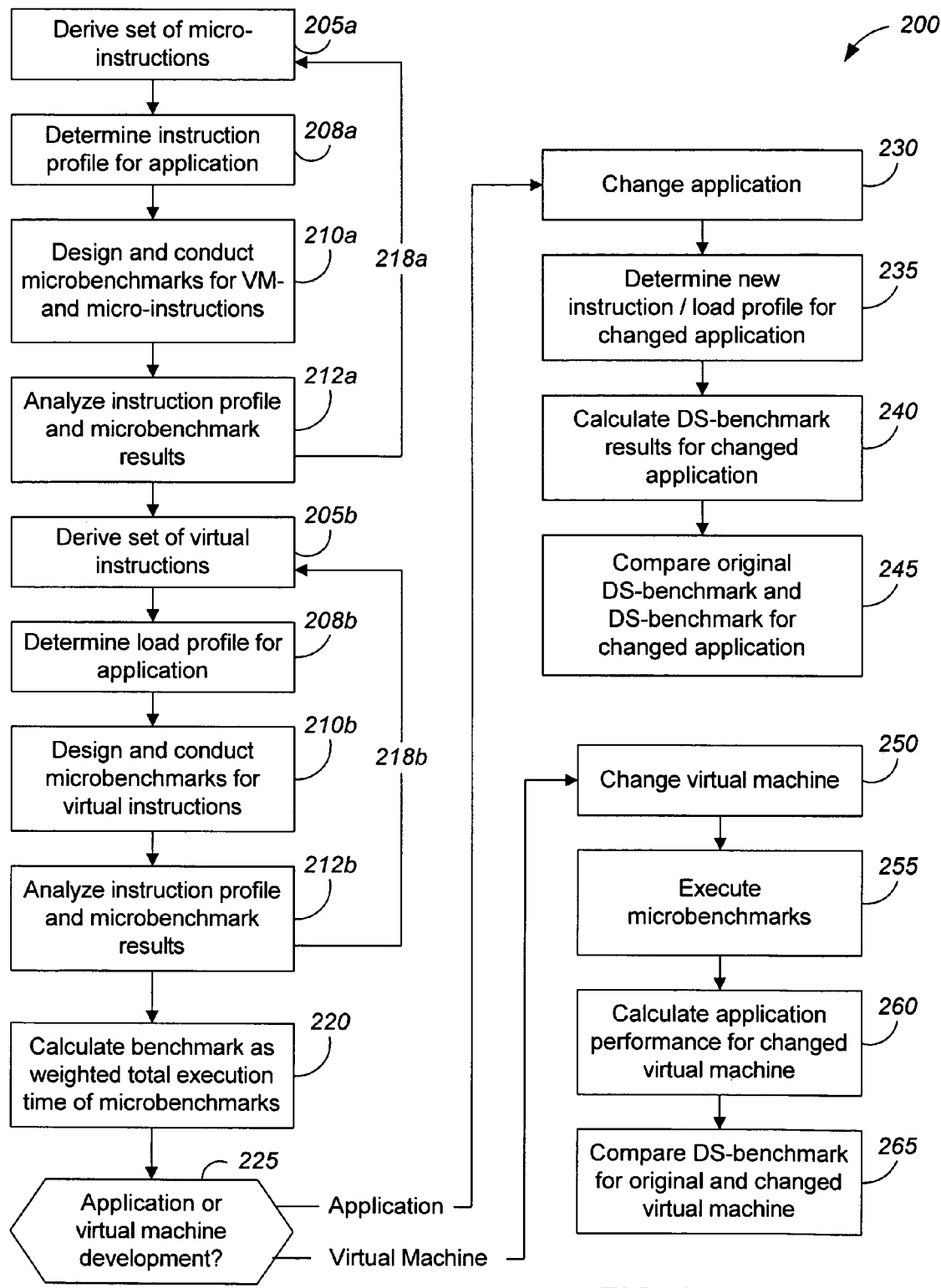
FIG. 2 is a flow diagram of a process for using a dynamic synthetic benchmark at different stages of development.

FIG. 2 is a flow diagram of a process 200 for using a dynamic synthetic benchmark to compare performance of a complex software system at different stages of development. The process 200 can be used to make comparisons at different stages of development of the underlying virtual machine. For example, the process 200 can be used to compare the performance of a particular application before and after making changes to the virtual machine. The process 200 can also be used to compare the performance of an application at different stages of the application development or between different versions of the application.

In accordance with the process 200, a first set of microinstructions can be defined on the basis of the instruction set of the virtual machine (step 205a). The application to be tested by the dynamic synthetic benchmark is analyzed to determine an instruction profile for the application (step 208a). To determine the instruction profile, the virtual machine instructions and/or micro-instructions included in the application are identified and the call frequency of each virtual machine instruction is determined. Microbenchmarks (i.e., single or multiple statement tests) are then designed and conducted on statements having instructions that match the virtual machine and/or micro-instructions (step 210a). One or several microbenchmarks can be implemented for each VM-instruction or micro-instruction. The microbenchmarks are used to measure the runtimes of individual virtual machine instructions and/or individual micro-instructions. If necessary, the process can be repeated one or more times (flow 218a) depending on the analysis of the results of the microbenchmarks and the instruction profile obtained for the application (step 212a). This might be the case, e.g., when an instruction is executed very frequently in the profiled application and/or it consumes a significantly large amount of the overall (application) execution time and/or when the distribution of the runtimes of the instruction in the end-user application is wide.

Thereafter, the micro-instructions and/or VM-instructions can be further refined to obtain a set of virtual instructions (step 205b). The application to be tested by the dynamic synthetic benchmark is analyzed to determine a load profile for the application (step 208b). The use of a load profile allows instructions to be more accurately mapped to microbenchmarks whose runtime behavior best represents the runtime behavior of the instructions in the profiled application. This allows for more relevant and reliable performance measurements. Microbenchmarks are then designed and conducted for statements having instructions that match the virtual instructions (step 210b). For each virtual instruction one or several microbenchmarks are implemented. If necessary, the process of defining virtual instructions can be repeated one or more times (flow 218b), depending on the analysis of the results of the microbenchmarks on the load profile obtained for the application (step 212b). For example, a particular instruction that is defined using a single dimension and which executed frequently in an application, might originally represent a class in the dimension containing a wide range of dimension values. As a result, it may be desirable to refine the original instruction by dividing the class into several narrower classes and to define a new virtual instruction for each new class. On the other hand, if the particular instruction only appears in an application a relatively small number of times and makes a small contribution to the overall runtime, it may not be worth refining the instruction.

The process of refining instructions is continued until the runtime behavior of the profiled application can be modeled sufficiently well using the instruction/load profile and the microbenchmarks. Generally, it is also possible to design and conduct microbenchmarks (at steps 210a and 210b) before the instruction profile (at step 208a)/load profile (at step 208b) is determined.

The performance of the dynamic synthetic benchmark is calculated as the weighted total execution time of microbenchmarks selected using the instruction/load profile (step 220). Accordingly, microbenchmarks that match the instructions identified in the profile are selected and are weighted according to the call frequency of each instruction.

If the process 200 is being used to compare performance of the application at different stages of application development, a change has been made to the application (step 225 to step 230). The change can relate, for example, to an evolution of the application from one version to another version. Once the changes have been made, a new instruction/load profile is determined for the changed application (step 235). The performance of the dynamic synthetic benchmark for the changed application is then calculated as the weighted total execution time of microbenchmarks selected using the profile for the changed application (step 240). A comparison between the original dynamic synthetic benchmark and the dynamic synthetic benchmark for the changed application is made to compare the application performance before and after the change (step 245). In general, if the virtual machine remains the same during the time when the application changes, it is not necessary to execute the microbenchmarks again; instead, it is possible to simply calculate the dynamic synthetic benchmark result on the basis of the new instruction/load profile and the results of previous microbenchmarks.

If the comparison relates to performance at different stages of development of the virtual machine, a change has been made to the virtual machine (step 225 to step 250), and microbenchmarks are executed again using the changed virtual machine (step 255). The application's performance is once again estimated by calculating the weighted total execution time on the basis of the new microbenchmark results (step 260). In general, if the application remains the same during the time when the virtual machine changes, it is not necessary to redetermine the instruction/load profile; instead, it is possible to simply conduct new microbenchmarks for the changed virtual machine.

In some cases, the application can undergo changes in parallel with the changes made to the virtual machine. In these instances, if the instruction profile is determined anew, it can be unclear whether differences in the original and new dynamic synthetic benchmarks are caused by changes to the application or changes to the virtual machine. Accordingly, to investigate if the differences are attributable to the changes to the virtual machine, the instruction profile (determined in step 208a) and/or the load profile (determined in step 208b) can be stored for subsequent use to calculate the application performance for the changed virtual machine. Using one and the same profile allows for evaluations of the effects of changes to the virtual machine on application performance (step 265), regardless of whether the application is being changed in parallel.

The comparison can be made for the application as a whole and/or for isolated components of the application (e.g., for use in identifying components that contribute to creeping performance deterioration and performance debugging, because the effects of kernel changes are more visible in statement runtimes than in application runtimes).

The application used in the process 200 can be a productive, real-world application. By developing a dynamic synthetic benchmark for one or more complex software systems or servers (or for a complex software system at different stages of development), one can predict the performance of a complex software system or compare the performance of different complex software systems. To investigate the performance of all aspects of a complex software system (e.g., a system in which some aspects have a greater influence than others on the performance of a particular application), instruction profiles can be obtained for several different applications. In some cases, the profiled applications can be application benchmark programs, which can be used, in addition to the dynamic synthetic benchmarks, to provide a more robust performance evaluation infrastructure.

It was mentioned earlier that instruction profiles are obtained using a profiler, that is, a profiling tool that determines the call frequencies of a running application. As will be described; it is optional but advantageous that the profiler also measure the execution times of individual virtual machine instructions. The functions of such a profiling tool will now be described.

When profiling an executing program, the profiler measures the execution times, the call frequencies, and other statistics of the virtual machine instructions of the program.

Instruction execution times are conveniently calculated as wall clock time by taking the time before and after executing the instruction and calculating the elapsed time. To reduce the amount of data that must be processed during a profiler run, the elapsed times are not stored individually. For each instruction, the cumulative execution time and the cumulative squared execution time are stored. In addition, the following information is recorded: total number of times the instruction was called, the maximum execution time, and the minimum execution time.

From these basic statistics, the mean execution time and the relative frequency of the instruction in the real-world application are calculated. The overall execution time is calculated as the sum of the cumulative execution times of all the defined instructions.

It can be advantageous to have the profiler code implemented in productive systems; however, this can be a potential cause of performance deterioration. One way to reduce the risk is to implement a tracing interpreter loop for the virtual machine. When instruction trace is activated for an application, the application is executed in the tracing loop, which is instrumented for profiling; otherwise, the normal loop is used, which has no instrumentation. Executing the application in the profiler loop has the advantage that instrumentation of the normal loop is not necessary and negative effects on the performance of the system when the trace is inactive are avoided.

A common source of performance measurement error in 3-tier architectures is found in the database layer. Depending on the load on the database, the time spent in database calls might vary between performance measurements, resulting in inaccurate and unreliable performance metrics.

To obtain an accurate measurement of the performance of kernel coding, the profiler implemented in a 3-tier architecture records database times separately to provide better comparisons.

An important advantage of implementing the profiler as described is that it measures the performance of virtual instructions in running applications. Because of its design, however, profiler time measurements generally do not provide sufficiently accurate and reliable time measurements of virtual machine instructions. This is largely due to the kernel instrumentation, which introduces systematic error, and the dependency of the sample sizes on the call frequencies of the instructions. Because the profiler measures end-user applications which generally have large execution times, it is not always practicable to increase the sample sizes by repeating the profiler run.

The features for obtaining load profiles can be divided into two parts; defining virtual instructions and profiling running applications.

To reduce permanent disturbances in productive systems and to allow for the possibility of conditional compiling, virtual instructions are defined for the profiler using macros. Because it is not practicable to define each virtual instruction in its own macro, it is advantageous to use a set of macros that allow for generic definitions of virtual instructions. Corresponding to the refinement of virtual machine instructions to virtual instructions, different macros are implemented for defining virtual machine instructions, defining micro-instructions, and defining virtual instructions.

Using macros allows for generic definitions of a large number of virtual instructions. It also provides the flexibility required to refine existing instructions. Also, with code in the macros, the definitions of the virtual instructions at different stages of development can be recorded. This allows for better comparisons.

The following basic statistical data is recorded for each virtual instruction:

i. The absolute frequency (call frequency) of the instruction.

ii. The cumulative gross execution time (a gross time includes database time).

iii. The minimum gross runtime.

iv. The maximum gross runtime.

v. The cumulative squared gross execution time.

vi. The cumulative database time.

vii. The cumulative squared database time.

viii. The cumulative squared gross execution time.

ix. The number of database calls.

As described above in reference to Eq. 2, the average runtime for a virtual instruction can be a weighted average of multiple microbenchmarks. One way of determining the weights for Eq. 2 will now be described.

For simplicity, consider an end-user application A consisting of a single instruction I.

Let T be the true runtime of I. Let $Ts=\{t_1, \ldots, t_n\}$ be the mean runtimes measured using the microbenchmarks $S=\{s_1, \ldots, s_n\}$ mapped to I using $\phi$. In order to have a good estimation of the performance of I in A using the metric $T_w$ of Eq. 2, it is required that $$T \approx \alpha_i \cdot t_i + \ldots + \alpha_n \cdot t_n.$$

We therefore need a function, which we will call $\omega$, to determine the weights for the microbenchmark runtimes in Ts:

$$\omega: Ts \rightarrow \alpha_1, \ldots, \alpha_n.$$

Each $\alpha_i$ can be set to $1/n$, where n is the number of microbenchmarks implemented for the virtual instruction, so that each of the microbenchmarks is equally weighted. These normalized weights can be used for the performance metric. It is useful to store the weights as part of the mapping information of dynamic synthetic benchmarks. This has the advantage that for each load profile, several mappings can be stored, each with different weights modeling the dimension in a different way. If the number of microbenchmarks for a pseudo-dimension is increased to increase the accuracy of performance measurements, a new mapping can be generated which takes into account the runtimes of these new microbenchmarks. The old mappings can remain unchanged. Preserving old mappings has a number of advantages when comparing performance at different stages of development. A mapping can then be thought of as a mask which is laid over the load profile to determine the way in which pseudo-dimensions are modeled and which influences the accuracy of the performance measurements. This further increases the flexibility of dynamic synthetic benchrmarks.

As was mentioned earlier, the techniques described in this specification can be used to assess system performance at different stages of development. For example, during kernel development, at least the following comparisons are of interest: (1) performance comparisons of different kernel releases; and (2) performance comparisons of different stages of development in the same release. This will now be described in more detail.

Because micro-instructions can be refined or new micro-instructions can be implemented during kernel development, two methods have been developed for comparing the performance of the kernel at different stages of development using dynamic synthetic benchmarks: (1) bottom-up comparisons, and (2) top-down comparisons. These methods are described below.

In a bottom-up comparison, a kernel at a first and second stage of development, K1 and K2, respectively, are compared. To do so, two suites of microbenchmarks, S1 and S2, at the same stages of development as the corresponding kernel stages, are prepared, such that every microbenchmark in S1 is also found in S2, i.e., $S1 \subset S2$.

A bottom-up comparison of K1 and K2 is performed as follows.

At the first stage of development, a suitable end-user application is profiled with K1. The resulting load profile is mapped using the functions $\phi$ and $\omega$ to S1 and the resulting map is stored together with the load profile as a dynamic synthetic benchmark BK1. S1 is executed with K1 and the results R1 are saved.

At the second stage of development, S2 is executed with K2 and the results R2 are saved. Using BK1, R1 and R2, the values of the performance metric are calculated for K1 and K2 respectively. This is possible because $S1 \subset S2$. Finally, the performance metric values are compared. For statistical validity, performance metrics are compared using an appropriate confidence interval, e.g., 95%.

Bottom-up comparisons have the advantage that the performance of K1 can always be compared with later kernels using BK1 if R1 is comparable to R2, i.e., if they were measured with the same specified conditions. This is possible because BK1 and R1 are saved and because S1 is a subset of later versions of the microbenchmark suite.

However, if the specified system conditions, such as hardware conditions, cannot be maintained between microbenchmark measurements, e.g., due to hardware upgrades, R1 and R2 are not comparable. To obtain comparable results, S1 must then again be executed in the same measurement environment as S2 using K1. If the stages of development lie wide apart, K1 may no longer be available for performance measurements. Also, because end-user applications themselves typically undergo development, by using load-profiles determined at early stages of development, bottom-up comparisons might not give a good representation of the performance changes of the kernel in current applications.

In a top-down comparison, K1, K2, S1, and S2 are given, as above. Top-down comparisons at different stages of development are performed as follows.

At the first stage of development, S1 is executed with K1 and the results R1 are saved.

At the second stage of development, a suitable end-user application is profiled with K2. The resulting load profile is mapped to S2 and the resulting map $M_{S2}$ is stored together with the load profile as a dynamic synthetic benchmark BK2. S2 is executed with K2 and the results R2 are saved.

If the microbenchmarks used in $M_{S2}$ all exist in S1 and specified system conditions have been maintained, then using BK2, R1, and R2, performance metric values can be calculated for K1 and K2, respectively, and compared using an appropriate confidence interval.

If, however, new microbenchmarks have been implemented for virtual instructions at later stages of development, e.g., to refine the instructions, not all microbenchmarks used in $M_{S2}$ might exist in S1. In this case, S2 is executed with K1 and the results R01 saved, and the performance metric values are calculated for K1 and K2, respectively, using BK2, R01 and R2.

While top-down comparisons might be more relevant because load profiles are obtained for current end-user applications, they have a number of weaknesses. If kernel developments have taken place which implement new VM-instructions or micro-instructions, this functionality will not be available in K1. Mappings to microbenchmarks measuring the performance of new instructions must therefore be ignored. This, in turn, reduces the relevance of the performance measurements.

The computational aspects of the invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The invention can be used for evaluating the performance of applications running on an abstract machine for which an interpreter exists. Thus, dynamic synthetic benchmarks can be implemented on any hardware platform on which a virtual machine is capable of running (including PDAs and mobile phones, if desired). In general, the invention can be implemented for code executed by an interpreter that can be instrumented (e.g., to trace the virtual machine instructions) and where there is an identifiable correlation between the executing code and the high-level language. Furthermore, the invention can be implemented on any machine executing any code (e.g., intermediate code or machine code). In case of machine code, compiler builders can support the invention by enriching the compiled code (controlled by a compile option) with information about the logical operation and the data used by the operation.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Figure 3:
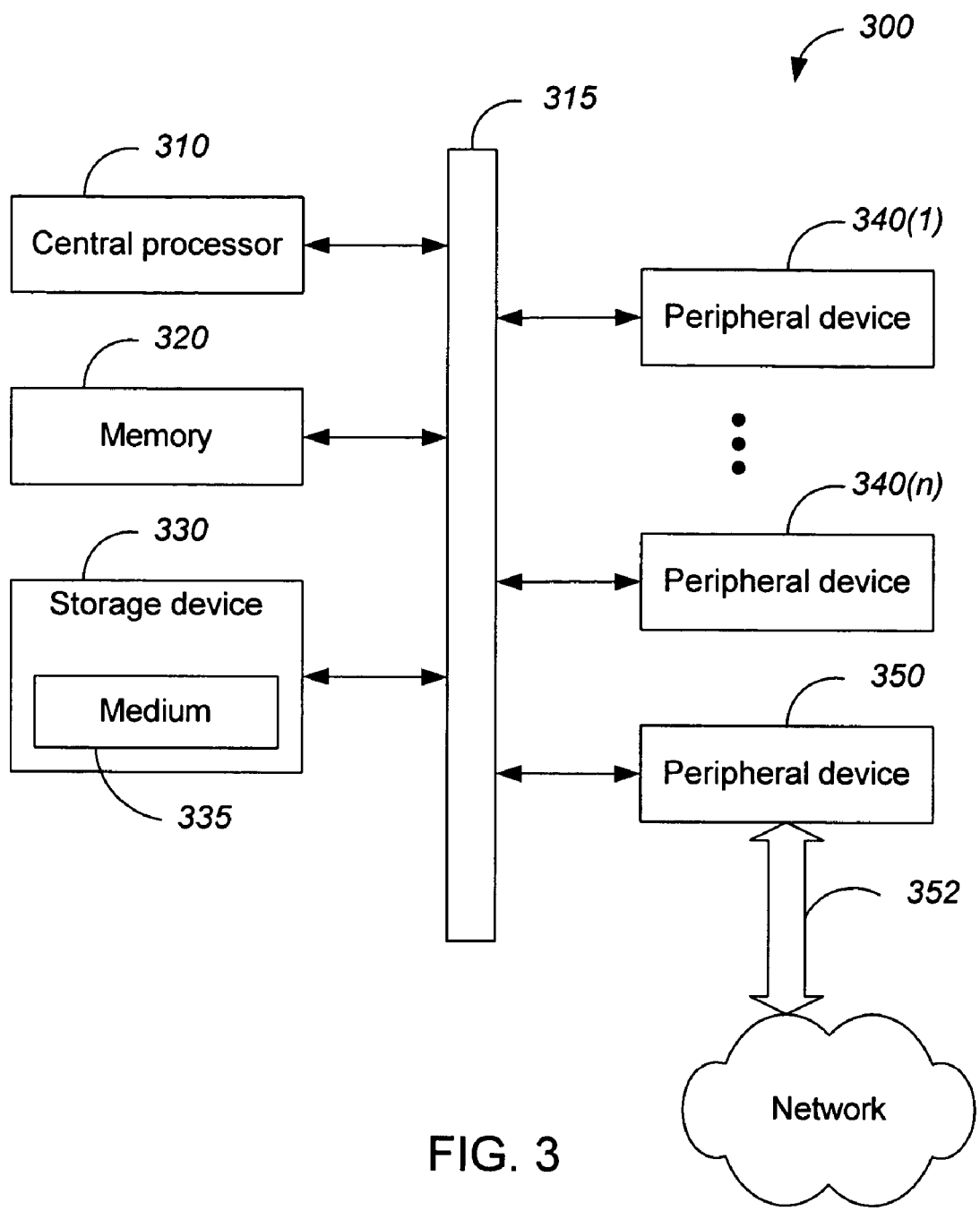
FIG. 3 is a block diagram of a computer that can be used to implement the invention.

Processors suitable for the execution of a computer program include, by way of example, both general and special purpose microprocessors, and any one or more processors of any kind of digital computer. Generally, a processor will receive instructions and data from a read-only memory or a random access memory or both. FIG. 3 is a block diagram of a computer 300 that can be used to implement the invention. The computer includes a central processor 310 for executing instructions and one or more memory devices 320 for storing instructions and data. Generally, the computer 300 will also include, or be operatively coupled to receive data from or transfer data to, or both, at least one mass storage device 330 for storing data. The storage device 330 can include at least one removable storage medium 335, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The central processor 310 and the memory devices 320 can be supplemented by, or incorporated in, special purpose logic circuitry.

The computer 300 can further include one or more peripheral devices 340(1)-340(n). For example, to provide for interaction with a user (e.g., to display performance results and to receive instructions for conducting tests), the invention can be implemented on a computer 300 having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computer can further include a peripheral device 350 that interfaces (as indicated at 352) with a network to send and receive data. Communications between the central processor 310, the memory devices 320, the storage device 330, and the peripheral devices 340 and 350 are transmitted by one or more busses 315.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. The invention can also be used to test changes in performance that result from changes to an actual machine, as opposed to a virtual machine. In addition, the invention can be implemented in environments other than those discussed. For example, the invention can be implemented in connection with a Java Virtual Machine or a Microsoft® NET environment.

What is claimed is:

1. A computer-implemented method of measuring performance in a data processing system having a kernel including a virtual machine, the method comprising:
    obtaining an instruction profile for an application, the instruction profile including information identifying instructions of the application and call frequencies of the instructions;
    refining at least one instruction to provide one or more sub-instructions, the one or more sub-instructions identifying a type of a system call variation of the at least one instruction, wherein information about the type of system call is stored in a predefined flagbyte;
    obtaining a load profile based on the system call variation of the at least one instruction;
    providing a set of microbenchmarks for measuring runtimes of statements of a high-level programming language having instructions which match the instructions of the application;
    mapping the set of microbenchmarks to the instruction profile and the load profile to define a dynamic synthetic benchmark, wherein microbenchmarks mapped to the instruction profile are a subset of microbenchmarks mapped to the load profile; and
    quantifying the dynamic synthetic benchmark based on independently measuring the microbenchmarks, wherein the dynamic synthetic benchmark is quantified as a function of a total number of profiled instructions, call frequencies of sub-instructions, a number of implemented microbenchmarks for each sub-instruction, and a mean runtime of each microbenchmark.

2. The method of claim 1, wherein at least one instruction of the instruction profile is refined based on at least one secondary characteristic to provide the one or more sub-instructions.

3. The method of claim 1, wherein the system call variation is one of a plurality of system call variations, each of which can be executed using a common instruction.

4. The method of claim 1, further comprising refining at least one of the one or more sub-instructions to provide one or more virtual instruction based on a runtime behavior of the at least one of the one or more sub-instructions.

5. The method of claim 1, further comprising:
    executing the microbenchmarks and calculating the dynamic synthetic benchmark to obtain a first benchmark result;
    changing the kernel and subsequently executing the microbenchmarks on the changed kernel;
    calculating the dynamic synthetic benchmark to obtain a second benchmark result; and
    comparing the first and the second benchmark results to assess the effect of changing the kernel without obtaining a new profile.

6. The method of claim 1, further comprising:
    executing the microbenchmarks and calculating the dynamic synthetic benchmark to obtain a first benchmark result;
    changing the application and subsequently obtaining a changed instruction profile of the changed application;
    mapping the changed instruction profile to the microbenchmarks to define a changed dynamic synthetic benchmark;
    calculating the changed dynamic synthetic benchmark to obtain a second benchmark result; and
    comparing the first and the second benchmark results to assess the effect of changing the application without again executing the microbenchmarks.

7. The method of claim 1, wherein:
    the dynamic synthetic benchmark has a performance metric that is a weighted total execution time that satisfies:

$$T_w = \sum_{i=1}^{n} f_i \cdot \sum_{j=1}^{m_i} \alpha_{i,j} \cdot t_{i,j},$$

where n is the total number of profiled instructions, $f_i$ is a call frequency of a profiled i-th sub-instruction, $m_i$ is a number of one or more microbenchmarks implemented for the i-th sub-instruction, $t_{i,j}$ is the mean runtime of a j-th microbenchmark for the i-th sub-instruction, and $\alpha_{i,j}$ is a non-negative weight; and where:
    $m_i$ is greater than 1 for at least one i, and
    $\alpha_{i,j} = 1/m_i$.

8. A system for measuring performance in a data processing system having a kernel including a virtual machine, the system comprising one or more data processing apparatus having one or more processors to execute a computer program, the computer program being executed by the one or more processors to cause the one or more data processing apparatus to perform operations comprising:
    obtaining an instruction profile for an application, the instruction profile including information identifying instructions of the application and call frequencies of the instructions;
    refining at least one instruction to provide one or more sub-instructions, the one or more sub-instructions identifying a type of a system call variation of the at least one instruction, wherein information about the type of system call is stored in a predefined flagbyte;

obtaining a load profile based on the system call variation of the at least one instruction;

providing a set of microbenchmarks for measuring runtimes of statements of a high-level programming language having instructions which match the instructions of the application;

mapping the set of microbenchmarks to the instruction profile and the load profile to define a dynamic synthetic benchmark, wherein microbenchmarks mapped to the instruction profile are a subset of microbenchmarks mapped to the load profile; and quantifying the dynamic synthetic benchmark based on independently measuring the microbenchmarks, wherein the dynamic synthetic benchmark is quantified as a function of a total number of profiled instructions, call frequencies of sub-instructions, a number of implemented microbenchmarks for each sub-instruction, and a mean runtime of each microbenchmark.

9. The system of claim 8, wherein at least one instruction of the instruction profile is refined based on at least one secondary characteristic to provide the one or more sub-instructions.

10. The system of claim 8, wherein the system call variation is one of a plurality of system call variations, each of which can be executed using a common instruction.

11. The system of claim 8, wherein the operations further comprise refining at least one of the one or more sub-instructions to provide one or more virtual instruction based on a runtime behavior of the at least one of the one or more sub-instructions.

12. The system of claim 8, wherein the operations further comprise:

executing the microbenchmarks and calculating the dynamic synthetic benchmark to obtain a first benchmark result;

changing the kernel and subsequently executing the microbenchmarks on the changed kernel;

calculating the dynamic synthetic benchmark to obtain a second benchmark result; and comparing the first and the second benchmark results to assess the effect of changing the kernel without obtaining a new profile.

13. The system of claim 8, wherein the operations further comprise:

executing the microbenchmarks and calculating the dynamic synthetic benchmark to obtain a first benchmark result;

changing the application and subsequently obtaining a changed instruction profile of the changed application;

mapping the changed instruction profile to the microbenchmarks to define a changed dynamic synthetic benchmark;

calculating the changed dynamic synthetic benchmark to obtain a second benchmark result; and comparing the first and the second benchmark results to assess the effect of changing the application without again executing the microbenchmarks.

14. The system of claim 8, wherein:

the dynamic synthetic benchmark has a performance metric that is a weighted total execution time that satisfies:

$$T_w = \sum_{i=1}^{n} f_i \cdot \sum_{j=1}^{m_i} \alpha_{i,j} \cdot t_{i,j},$$

where n is the total number of profiled instructions, $f_i$ is a call frequency of a profiled i-th sub-instruction, $m_i$ is a number of one or more microbenchmarks implemented for the i-th sub-instruction, $t_{i,j}$ is the mean runtime of a j-th microbenchmark for the i-th sub-instruction, and $\alpha_{i,j}$ is a non-negative weight; and where:

$m_i$ is greater than 1 for at least one i, and $\alpha_{i,j} = 1/m_i$.

15. A computer program product stored in a machine-readable storage device for deploying software to a computer system, the computer product comprising instructions that when executed by a processor to perform the steps of:

obtain an instruction profile for an application, the instruction profile including information identifying instructions of the application and call frequencies of the instructions;

refine at least one instruction to provide one or more sub-instructions, the one or more sub-instructions identifying a type of a system call variation of the at least one instruction, wherein information about the type of system call is stored in a predefined flagbyte;

obtain a load profile based on the system call variation of the at least one instruction;

provide a set of microbenchmarks for measuring runtimes of statements of a high-level programming language having instructions which match the instructions of the application;

map the set of microbenchmarks to the instruction profile and the load profile to define a dynamic synthetic benchmark, wherein microbenchmarks mapped to the instruction profile are a subset of microbenchmarks mapped to the load profile; and quantify the dynamic synthetic benchmark based on independently measuring the microbenchmarks, wherein the dynamic synthetic benchmark is quantified as a function of a total number of profiled instructions, call frequencies of sub-instructions, a number of implemented microbenchmarks for each sub-instruction, and a mean runtime of each microbenchmark.

16. The computer program product of claim 15, wherein the system call variation is one of a plurality of system call variations, each of which can be executed using a common instruction.

17. The computer program product of claim 15, wherein the instructions further induce the computer system to refine at least one of the one or more sub-instructions to provide one or more virtual instruction based on a runtime behavior of the at least one of the one or more sub-instructions.

18. The computer program product of claim 15, wherein the instructions are further induce the computer system to:

execute the microbenchmarks and calculating the dynamic synthetic benchmark to obtain a first benchmark result;

change the kernel and subsequently executing the microbenchmarks on the changed kernel;

calculate the dynamic synthetic benchmark to obtain a second benchmark result; and compare the first and the second benchmark results to assess the effect of changing the kernel without obtaining a new profile.

19. The computer program product of claim 15, wherein the instructions are further induce the computer system to:
- execute the microbenchmarks and calculating the dynamic synthetic benchmark to obtain a first benchmark result;
- change the application and subsequently obtaining a changed instruction profile of the changed application;
- map the changed instruction profile to the microbenchmarks to define a changed dynamic synthetic benchmark;
- calculate the changed dynamic synthetic benchmark to obtain a second benchmark result; and
- compare the first and the second benchmark results to assess the effect of changing the application without again executing the microbenchmarks.

20. The computer program product of claim 15, wherein:
the dynamic synthetic benchmark has a performance metric that is a weighted total execution time that satisfies:

$$T_w = \sum_{i=1}^{n} f_i \cdot \sum_{j=1}^{m_i} \alpha_{i,j} \cdot t_{i,j},$$

where n is the total number of profiled instructions, $f_i$ is a call frequency of a profiled i-th sub-instruction, $m_i$ is a number of one or more microbenchmarks implemented for the i-th sub-instruction, $t_{i,j}$ is the mean runtime of a j-th microbenchmark for the i-th sub-instruction, and $\alpha_{i,j}$ is a non-negative weight; and where:

$m_i$ is greater than 1 for at least one i, and $\alpha_{i,j} = 1/m_i$.

* * * * *